United States Patent [19]
Barth et al.

[11] Patent Number: 5,977,229
[45] Date of Patent: Nov. 2, 1999

[54] HYDROPHILICALLY MODIFIED POLYETHYLENE RESINS

[75] Inventors: Christiane Barth, Oberhausen; Jens Ehlers, Hamminkeln; Stanislaw Haftka, Wesel, all of Germany

[73] Assignee: Hoechst Aktiengesellschaft, Germany

[21] Appl. No.: 08/711,673

[22] Filed: Sep. 4, 1996

[30] Foreign Application Priority Data

Oct. 2, 1995 [DE] Germany .................. 195 36 558

[51] Int. Cl.⁶ .................................... C08J 5/06
[52] U.S. Cl. ................ 524/377; 523/200; 523/202; 524/585; 524/587
[58] Field of Search ................. 524/377, 585, 524/587; 523/200, 202

[56] References Cited

U.S. PATENT DOCUMENTS

| | | | |
|---|---|---|---|
| 3,351,495 | 11/1967 | Larsen et al. | 136/146 |
| 3,853,601 | 12/1974 | Taskier | 117/98 |
| 5,213,745 | 5/1993 | Izod et al. | 264/203 |
| 5,369,134 | 11/1994 | Grab et al. | 521/57 |

FOREIGN PATENT DOCUMENTS

| | | |
|---|---|---|
| 0114503 | 8/1984 | European Pat. Off. . |
| 0335613 | 10/1989 | European Pat. Off. . |
| 0425886 | 5/1991 | European Pat. Off. . |
| 0565073 | 10/1993 | European Pat. Off. . |
| 755075 | 2/1971 | France . |
| 1206234 | 9/1970 | United Kingdom . |
| 1549949 | 8/1979 | United Kingdom . |

*Primary Examiner*—Peter D. Mulcahy
*Attorney, Agent, or Firm*—Bierman, Muserlian and Lucas

[57] ABSTRACT

Hydrophilically modified high and/or ultra-high molecular weight polyethylene (HMW-PE or UHMW-PE) coated with a mixture comprising 1–99.9% by weight of at least one water-soluble additive and 0.1 to 99% by weight of at least one water-insoluble additive, the content of the mixture being 0.1 to 10% by weight, based on the total weight of hydrophilically modified HMW-PE and/or UHMW-PE and a process for the preparation of the hydrophilically modified HMW-PE and/or UHMW-PE and its use for the production of porous moldings.

14 Claims, No Drawings

HYDROPHILICALLY MODIFIED POLYETHYLENE RESINS

STATE OF THE ART

High molecular weight polyethylene (HMW-PE) and ultra high molecular weight polyethylene (UHMW-PE) are understood as meaning linear polyethylenes obtained by the low pressure process, HMW-PE having an average molecular weight, measured by viscometry, of $3 \times 10^5$ g/mol to $1 \times 10^6$ g/mol and UHMW-PE having an average molecular weight, measured by viscometry, of at least $1 \times 10^6$ g/mol, and in particular $2.5 \times 10^6$ g/mol to about $1 \times 10^7$ g/mol. A method for the determination of the molecular weights is described, for example, in CZ—Chemische Technik 4 (1974), 129 et seq.

Because of its favorable physical, chemical and mechanical properties, UHMW-PE has found acceptance as a high-grade special material in the most diverse industrial fields. Examples are the textile, foodstuffs and packaging industry, the chemical industry and mechanical engineering. However, the fact that, because of its high average molecular weight, UHMW-PE does not form a free-flowing melt when heated to temperatures above the crystallite melting point but passes into a viscoelastic state of extremely high melt viscosity has often proved a disadvantage during UHMW-PE processing. The production of shaped articles from UHMW-PE by the methods customary for thermoplastics is therefore possible only with special precautions and modifications. on the other hand, the thermal properties of UHMW-PE described above are of advantage for the production of porous moldings, for example by sintering.

If the UHMW-PE in general obtained as a fine-grained powder after the polymerization is heated to temperatures above the crystallite melting point, the individual grains are retained in principle, and melt only at the points where they touch, to form so-called contact necks, and form a three-dimensional porous body. The properties of the porous bodies, such as porosity (pore sizes, pore size distribution), strength, rigidity and pressure loss, can be adjusted in a controlled manner by varying the particle size distribution of the UHMW-PE starting material and by addition of other components which form a free-flowing melt, such as pulverulent PE wax or PE-HD. The sintering parameters of pressure, temperature and sinter time are furthermore variables which influence the properties of the porous bodies. HMW-PE shows similar thermal properties to UHMW-PE and can also be processed to porous moldings by the processes described above.

Porous HMW-PE and UHMW-PE moldings produced in this manner find diverse uses. Porous UHMW-PE moldings are employed, for example, in the form of films and membranes for the most diverse filtering and separation tasks in many chemical and bioengineering processes (StrauB, Kunststoffe, Vol. 82 (1992), p. 338 et seq.). However, porous UHMW-PE moldings are also used for other purposes, for example as sound absorbers in compressed air engineering, for aerating liquids, for fluidizing powders for transportation purposes, for deaerating bulk goods for the purpose of more effective packaging and as storage and metering elements for dyestuffs and fragrances.

However, a disadvantage which limits the number of possible uses lies in the fact that pure HMW-PE or UHMW-PE has a hydrophobic character. For certain uses, especially in the field of filtering, it is desirable and necessary for the porous materials employed also to have, in particular, a certain permeability to and wettability by water, in addition to excellent physical, mechanical and chemical properties. If porous moldings of pure HMW-PE or UHMW-PE are employed, for example for filtration of aqueous solutions, undesirably high pressure losses occur at the filter media because of the hydrophobicity.

It is known from the prior art that porous moldings of polyolefins can be modified hydrophilically by treatment with the most diverse agents. U.S. Pat. No. 3,853,601 describes microporous polyolefin films which are treated with a silicone/glycol copolymer to render them hydrophilic. According to U.S. Pat. No. 4,290,987, microporous polyolefin hollow fibers furthermore are brought into contact with polyvinylpyrrolidone as a surface-active substance. It is moreover known from U.S. Pat. No. 4,298,666 and Canadian Patent No. 981,998 that phosphate esters such as ethoxylated 2-ethylhexyl phosphate, imidazolines, fatty acids and their alkali metal salts and various fatty amines can be employed for hydrophilic treatment of microporous polyolefin films.

With hydrophilic modifications carried out in this manner on already shaped porous products, however, the problem arises that uniform and complete hydrophilization of the entire surface is often not achieved. Furthermore, because of a lack of adhesion of the hydrophilizing agents to the porous polyolefin material, the hydrophilization does not always meet the requirement of being sufficiently stable in contact with hydrophilic media. For example, if such porous moldings are treated with water over a relatively long period of time, and optionally at elevated temperature, the hydrophilizing agents applied are washed out and a rapid loss of hydrophilicity thus occurs.

One possibility of producing porous moldings having a hydrophilic surface specifically from UHMW-PE comprises using in this production, UHMW-PE powder which has already been modified hydrophilically beforehand. DE-OS-42 43 577 describes a process for rendering UHMW-PE hydrophilic, in which the pulverulent polymer is treated (dressed) with a mixture of an inert gas and sulfur trioxide at temperatures from 0 to 80° C., preferably in the presence of an alkali metal salt or alkaline earth metal salt of an aliphatic or aromatic mono- or dicarboxylic acid. As a result of the dressing operation, the individual polymer particles are provided with polar groups. UHMW-PE powders modified in this manner can then be further processed to porous moldings by sintering. However, the hydrophilicity suffers severely due to the exposure to heat during sintering. Furthermore, by-products are already obtained during dressing of the UHMW-PE powder.

OBJECTS OF THE INVENTION

It is an object of the invention to provide hydrophilically modified HMW-PE and/or UHMW-PE, the hydrophilic modification of which shows an increased long-term stability and heat stability in contact with hydrophilic media and a process for its preparation.

It is another object of the invention to provide improved porous moldings made therefrom.

These and other objects and advantages of the invention will become obvious from the following detailed description.

THE INVENTION

The novel compositions of the invention are comprised of at least one hydrophilically modified member of the group consisting of high molecular weight polyethylene and ultra high molecular weight polyethylene coated with 0.1 to 10% by weight, based on the total weight of the hydrophilically modified polyethylene, of a mixture of A) 1 to 99.9% by weight of at least one water-soluble additive and B) 0.1 to 99% by weight of at least one water-insoluble additive.

The water-soluble additives (component A) are generally understood as meaning wetting agents such as water-soluble surfactants or water-soluble polyalkylene glycols. Water-soluble surfactants which can be employed are anionic, cationic and nonionic surfactants, and water-soluble anionic surfactants which contain carboxylate, sulfonate or sulfate groups as functional groups are particularly suitable above all.

Examples of anionic surfactants which can be employed are water-soluble alkylbenzenesulfonates, alkanesulfonates, fatty alcohol sulfates, fatty alcohol ether sulfates, α-olefin sulfonates, α-ester sulfonates, alkyl phosphates or alkyl ether phosphates. Water-soluble alkane sulfonates, particularly those having 13 to 17 carbon atoms, are preferred.

Water-soluble nonionic surfactants which can furthermore be used are water-soluble fatty alcohol ethoxylates, alkylphenol ethyoxylates, fatty amine ethyoxylates, fatty acid ethoxylates, fatty acid ester ethoxylates or alkanolamines. Water-soluble polyalkylene glycols which are preferably employed are water-soluble polyethylene glycols and/or their corresponding mono- or di-alkyl ethers of 1 to 13 carbon atoms, it being possible for the alkyls to be branched or unbranched such as methyl, ethyl, propyl, n-butyl, i-butyl or tridecyl or the group derived from pentaerythritol. Liquid water-soluble polyethylene glycols and their corresponding mono- or diethers having an average molecular weight ($\overline{M}_n$) of up to 600 g/mol are particularly preferred. Waxy or solid polyethylene glycols of higher average molecular weight can also be used if they are water-soluble. The polyalkylene glycols employed, as is the case with all polymeric substances, are not chemically uniform compounds of defined molecular weight, but rather mixtures of polymer homologs which differ from one another in their degree of polymerization.

A water-insoluble additive is employed as component B which is a wetting agent in the form of water-insoluble polyalkylene glycols and/or their corresponding water-insoluble mono- or di-alkyl ethers of 1 to 13 carbon atoms, it being possible for the alkyls to be branched or unbranched such as methyl, ethyl, propyl, n-butyl, i-butyl or tridecyl or the group derived from pentaerythritol. Polypropylene glycols and/or their corresponding mono- or diethers having at least 4 and in particular 4–44 propylene glycol recurring units in the main polymer chain are preferred, and a polypropylene glycol monobutyl ether having at least 4 and in particular 4–44 propylene glycol recurring units in the main polymer chain is particularly preferred. Additives which are soluble to the extent of less than 0.1 part by weight in 100 parts by weight of water at room temperature are described as water-insoluble here.

Those additives which are liquid at room temperature are preferably employed as components A and B; however, substances which are solid at room temperature can also be employed. Components A and B which are heat-stable at the temperatures at which the hydrophilically modified HMW-PE and/or UHMW-PE is further processed to porous moldings are particularly suitable. Heat-stable in this context means that the hydrophilic character is still present even after processing to porous moldings. During further processing by sintering, the temperatures applied are generally in the range of 180 to 220° C.

The hydrophilically modified HMW-PE and/or UHMW-PE is coated by the invention with a mixture which comprises 1 to 99.9% by weight, preferably 5 to 90% by weight, more preferably 10 to 50% by weight and most preferably 10 to 25% by weight, of component A and 0.1 to 99% by weight, preferably 10 to 95% by weight, more preferably 50 to 90% by weight and most preferably 75 to 90% by weight, of component B, the content of the mixture being 0.1 to 10% by weight, preferably 0.5 to 5% by weight, more preferably 0.7 to 2% by weight and most preferably 0.8 to 1.2% by weight, based on the total weight of hydrophilically modified HMW-PE and/or UHMW-PE. The hydrophilically modified HMW-PE and/or UHMW-PE is preferably pulverulent.

The invention also relates to a process for hydrophilic modification of preferably pulverulent HMW-PE and/or UHMW-PE, which comprises treating the HMW-PE and/or UHMW-PE with a mixture which comprises 1 to 99.9% by weight of at least one water-soluble additive (component A) and 0.1 to 99% by weight of at least one water-insoluble additive (component B), the mixture being employed in an amount of 0.1 to 10% by weight, based on the total weight of the mixture and HMW-PE and/or UHMW-PE.

All types of HMW-PE and/or UHMW-PE can be employed in the process of the invention for hydrophilic modification of HMW-PE and UHMW-PE, regardless of the nature of their preparation. Accordingly, polymers which are obtained by the Ziegler process by polymerization of ethylene in the presence of metals of Groups IVB–VIB of the periodic table of the elements (IUPAC version), together with organometallic compounds of elements of Groups IA–IIIA of the periodic table of the elements (IUPAC version) can be used. High and/or ultra-high molecular weight polyethylenes which have been prepared from anhydrous and oxygen-free ethylene in the gas phase in the presence of supported catalysts of chromium oxide and metal-alkyl can also be employed. HMW-PE or UHMW-PE as a rule has an average particle diameter of 3 to 3000 μm, preferably 10 to 1000 μm, and in particular 30 to 300 μm, with the most diverse particle size distributions.

The mixture of components A and B used for treatment of the HMW-PE and/or UHMW-PE comprises 1 to 99.9% by weight of component A and 0.1 to 99% by weight of component B, preferably 5 to 90% by weight of component A and 10 to 95% by weight of component B, more preferably 10 to 50% by weight of component A and 50 to 90% by weight of component B, and most preferably 10 to 25% by weight of component A and 75 to 90% by weight of component B. This mixture of components A and B is mixed intimately with the HMW-PE and/or UHMW-PE at room temperature, while stirring. The mixture of components A and B is employed here in an amount of 0.1 to 10% by weight, preferably 0.5 to 5% by weight, more preferably 0.7 to 2% by weight and most preferably 0.8 to 1.2% by weight, based on the total weight of mixture (A+B) and HMW-PE and/or UHMW-PE. As the percent by weight content of components A and B increases, the surface of the hydrophilically modified HMW-PE and/or UHMW-PE feels slightly soapy.

In the process of the invention, the total amounts of components A and B employed are deposited on the HMW-PE and/or UHMW-PE and no loss of coating composition occurs. When the HMW-PE and/or UHMW-PE is coated, sheathing of the HMW-PE and/or UHMW-PE occurs, which can also be regarded as a coating.

In a preferred embodiment of the process, the mixture of components A and B is not immediately brought into contact with the total envisaged amount of HMW-PE and/or UHMW-PE, but rather a batch is initially prepared in a first step. For this, the total amount of mixture of A and B is first mixed at room temperature with only a relatively small amount of HMW-PE and/or UHMW-PE, until homogeneous distribution of components A and B in the HMW-PE and/or UHMW-PE is achieved. The remaining amount of HMW-PE and/or UHMW-PE is then added to this batch in the second step.

Preferably, in the first step, the total amount of mixture of A and B is mixed with an amount of HMW-PE and/or UHMW-PE which is such that the batch formed comprises the mixture of components A and B to the extent of 5 to 30% by weight, and particularly to the extent of 10% by weight, and HMW-PE and/or UHMW-PE to the extent of 70 to 95% by weight, or in particular to the extent of 90% by weight. The remaining amount of HMW-PE and/or UHMW-PE is then mixed into this premix of A, B, HMW-PE and/or UHMW-PE.

If appropriate, components A and B can also be employed as a solution in a particular suitable solvent. These are understood as meaning solvents which do not attack the HMW-PE and/or UHMW-PE. This process variant is used, particularly if the two components A and B are present as a powder, i.e. in solid form, at room temperature.

In another embodiment of the process of the invention, the pulverulent HMW-PE and/or UHMW-PE is mixed first with component A and then with component B.

The invention also relates to the use of the hydrophilically modified HMW-PE and/or UHMW-PE for the production of moldings, particularly porous moldings. The porous moldings are preferably produced by sintering processes. Pulverulent HMW-PE and/or UHMW-PE which is coated with components A and B which are heat-stable at the sintering temperature, i.e. at 180 to 220° C., are employed in particular here. Sintering can be carried out by the processes customary for HMW-PE or UHMW-PE. It is an advantage here that the pourability of the hydrophilically modified powder is scarcely lower than that of pure HMW-PE or UHMW-PE powder. The modified powder can thus be processed by customary processes without problems.

The hydrophilic modification, i.e. the coating of the HMW-PE and/or UHMW-PE powder with the mixture of components A and B, is not damaged or impaired by the sintering operation. Using the HMW-PE and/or UHMW-PE modified by the invention, it is thus possible to obtain by this route porous moldings which on the one hand show the excellent profile of properties of the pure non-modified HMW-PE and/or UHMW-PE, and on the other hand, have a hydrophilic modification which has an excellent resistance to hydrophilic media even during long-term contact and at elevated temperatures. The effectiveness of the hydrophilization and the resistance to washing out are tested in the following examples.

In the following examples, there are described several preferred embodiments to illustrate the invention. However, it is to be understood that the invention is not intended to be limited to the specific embodiments.

EXAMPLES 1–6

COMPARISON EXAMPLE VI

Hydrophilic modification of pulverulent UHMW-PE.

Pulverulent UHMW-PE (®Holstalen GUR 4120) was treated at room temperature with mixtures of components A and B of different composition. ®Hostapur SAS 30, a water-soluble alkane sulfonate, was component A and ®Polyglycol B01/20, a polypropylene glycol monobutyl ether having a viscosity of 20 mm$^2$/s at 50° C., was component B. All the constituents are commercial products of Hoechst AG. The particular composition of the mixtures can be seen from Table 1.

In Examples 1 to 6, the total amount of mixture of components A and B, and in the comparison example, the total amount of component B, was mixed with Hostalen GUR 4120 at room temperature so that the resulting batch comprised the mixture of components A and B to the extent of 10% by weight and Hostalen GUR 4120 to the extent of 90% by weight. This batch was then mixed with further Hostalen GUR 4120 until the content of the mixture with respect to the total of the mixture and UHMW-PE was 1% by weight (Examples 1 to 5 and Comparison Example 1) or 0.5% by weight (Example 6).

Porous circular sheets were produced from this coated UHMW-PE powder by sintering over a period of 30 minutes at a temperature of 220° C. under atmospheric pressure in a sinter mold of steel having a diameter of 170 mm and a thickness of 7 mm. These sheets were exposed to the following method for testing the quality and permanence of the hydrophilic modification:

1. The sheets were weighed and left in a water-bath at room temperature until no further weight increase was observed. The weight increase in %, based on the starting weight, is shown in Table 1 under the heading: "Boiling time 0 minutes".
2. The sheets were then left in boiling water for 10 minutes and subsequently dried to a constant weight in a circulating air drying cabinet at 70° C.
3. The sheets were then left in water at room temperature until no further weight increase was observed. The weight increase, based on the weight determined under point 2, is shown in Table 1 under the heading: "Boiling time 10 minutes".
4. The sheets were again dried to a constant weight in a circulating air drying cabinet at 70° C.
5. Steps 2, 3 and 4 were carried out twice more. The particular weight increase of the sheets due to absorption of water after a total boiling time of 20 and 30 minutes can be seen from Table 1.

It can be seen that the sheets still have a significant hydrophilic character even after a boiling time of 30 minutes in water.

TABLE 1

| Example | 1 | 2 | 3 | 4 | 5 | 6 | VI |
| --- | --- | --- | --- | --- | --- | --- | --- |
| Component A in % by weight, based on the mixture | 5 | 10 | 25 | 50 | 90 | 10 | 0 |
| Component B in % by weight, based on the mixture | 95 | 90 | 75 | 50 | 10 | 90 | 100 |
| Mixture in % by weight, based on the total weight of mixture and UHMW-PE | 1 | 1 | 1 | 1 | 1 | 0.5 | 1 |
| Weight increase of the porous sheet in %, based on the starting weight, after the boiling time, in minutes | | | | | | | |
| 0 | | 63 | 65 | 56 | 80 | 60 | 58 | 6 |
| 10 | | 50 | 70 | 56 | 55 | 60 | 21 | 0 |
| 20 | | 51 | 67 | 54 | 57 | 50 | 16 | 0 |
| 30 | | 10 | 23 | 25 | 26 | 22 | 7 | 0 |

EXAMPLE 7

Long-term testing of the hydrophilic character of a sheet of hydrophilically modified UHMW-PE.

99% by weight of pulverulent UHMW-PE (®Hostalen GUR 2122 from Hoechst) were treated at room temperature with 1% by weight of a mixture comprising 10% by weight, based on the mixture, of Hostapur SAS 30 and 90% by weight, based on the mixture, of Polyglycol B01/20. A sheet was produced from the resulting hydrophilically modified UHMW-PE by sintering as in Examples 1 to 6. This sheet was left in a water-bath at room temperature until no further weight increase was observed. The weight increase in %, based on the starting weight, is shown in Table 2 under the heading: "0 (1st wetting)". The sheet was then dried to constant weight at 70° C. in a circulating air drying cabinet. Thereafter, the sheet was stored in water at room temperature for one month and the water was changed daily during this period. After the intervals of time listed in Table 2, the sheet was in each case taken out of the bowl, dried to a constant weight at 70° C. in a circulating air drying cabinet and then stored in the water-bath again. The absorption of water which then occurred was determined by weighing.

The values obtained are listed in Table 2.

| Example Storage of the sheet in water in days | 7 Weight increase in %, based on the starting weight |
|---|---|
| 0 (1st wetting) | 180 |
| 0.3 | 180 |
| 1.5 | 150 |
| 2 | 150 |
| 3 | 150 |
| 7 | 95 |
| 14 | 90 |
| 21 | 85 |
| 28 | 60 |

Various modifications of the products and process of the invention may be made without departing from the spirit or scope thereof and it is to be understood that the invention is intended to be limited only as defined in the appended claims.

What we claim is:

1. A composition comprising solid particles of at least one member of the group consisting of high molecular weight polyethylene and ultra high molecular weight polyethylene, said particles provided with a coating of 0.1 to 10% by weight based on the total weight of the polyethylene of a mixture A) 1 to 99.9% by weight of at least one water-soluble wetting agent and B) 0.1 to 99% by weight of at least one water-insoluble wetting agent to render them hydrophilic.

2. The composition of claim 1 containing 5 to 90% by weight of component A) and 10 to 95% by weight of component B).

3. The composition of claim 1 containing 10 to 50% by weight of component A) and 50 to 90% by weight of component B).

4. The composition of claim 1 containing 0.5 to 5% by weight of the mixture of A) and B).

5. The composition of claim 1 containing 0.7 to 2% by weight of the mixture of A) and B).

6. The composition of claim 1 wherein the polyethylene is pulverulent.

7. The composition of claim 1 wherein A) is a water-soluble surfactant or a water-soluble polyalkylene glycol.

8. A composition of claim 7 wherein component A) is a water-soluble anionic surfactant.

9. A composition of claim 7 wherein A) is a water-soluble alkane sulfonate.

10. A composition of claim 7 wherein A) is a water-soluble alkane sulfonate of 13 to 17 carbon atoms.

11. A composition of claim 7 wherein A) is at least one member of the group consisting of a water-soluble polyethylene glycol and mono- and di-alkyl ethers of 1 to 13 carbon atoms.

12. A composition of claim 1 wherein B) is at least one member of the group consisting of a water-insoluble polyalkylene glycol and mono- and di-alkylethers of 1 to 13 carbon atoms.

13. A composition of claim 12 wherein B) is a water-insoluble polypropylene glycol monobutyl ether with at least 4 propylene glycol recurring units.

14. A composition of claim 1 wherein A) and B) are liquid at room temperature.

* * * * *